United States Patent [19]

Asai

[11] Patent Number: 4,975,585
[45] Date of Patent: Dec. 4, 1990

[54] RADIATION DOSE MONITOR

[75] Inventor: Katsuji Asai, Amagasaki, Japan

[73] Assignee: Mitsubishi Denki Kabushiki Kaisha, Tokyo, Japan

[21] Appl. No.: 348,508

[22] Filed: May 8, 1989

[30] Foreign Application Priority Data

May 13, 1988 [JP] Japan .................................. 63-114756

[51] Int. Cl.$^5$ .............................................. G01T 1/185
[52] U.S. Cl. .................................. 250/385.1; 250/374
[58] Field of Search ............................... 250/385.1, 374

[56] References Cited

U.S. PATENT DOCUMENTS

| 3,808,441 | 4/1974 | Boux ................................. 250/385.1 |
| 3,997,788 | 12/1976 | Boux ................................. 250/385.1 |
| 4,034,222 | 7/1977 | Azem et al. ........................... 378/97 |
| 4,264,816 | 4/1981 | Walenta .............................. 250/374 |

Primary Examiner—Constantine Hannaher
Assistant Examiner—Edward J. Glick

[57] ABSTRACT

A radiation dose monitor includes a power supply electrode disposed on one side of an ionization chamber containing a gas which is ionized by a radiation beam, and a first pair of coplanar collector electrodes disposed on the other side of the ionization chamber from the power supply electrode, being separated from each other by a first band-shaped gap. A second pair of coplanar collector electrodes are disposed adjacent to the first pair of collector electrodes on the same side of the power supply electrode as the first pair of coplanar collector electrodes, and separated from each other by a second band-shaped gap which extends in a direction at an angle with respect to the first band-shaped gap. The second pair of coplanar collector electrodes receive an ionization current from the ionization chamber and through the first band-shaped gap.

7 Claims, 3 Drawing Sheets

FIG. 3
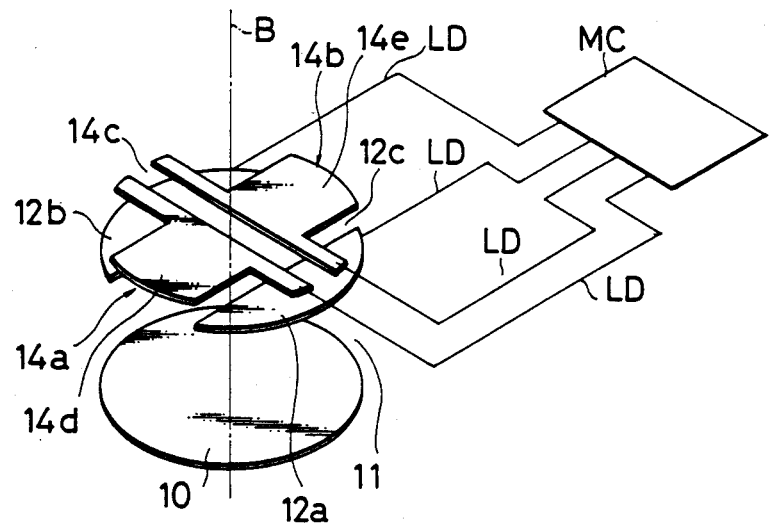
FIG. 4
FIG. 5
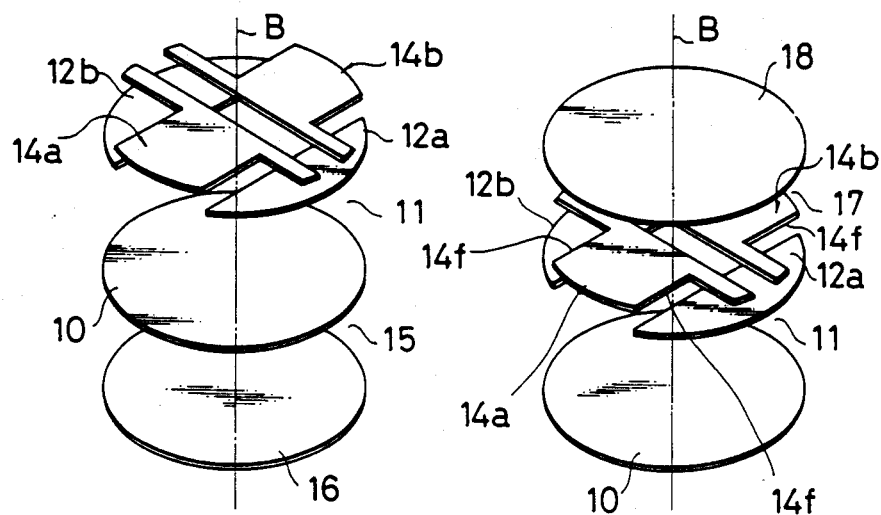

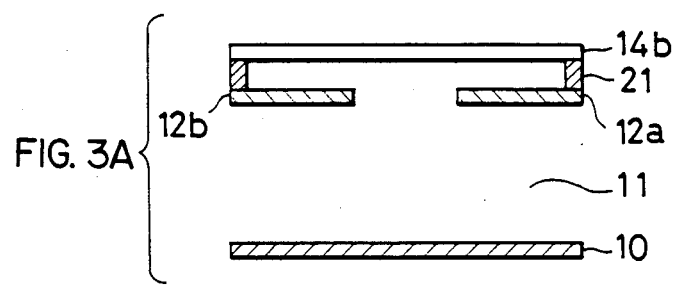
FIG. 3A { FIG. 3B
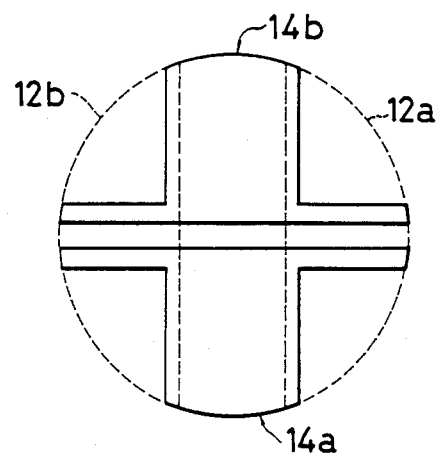
FIG. 5A
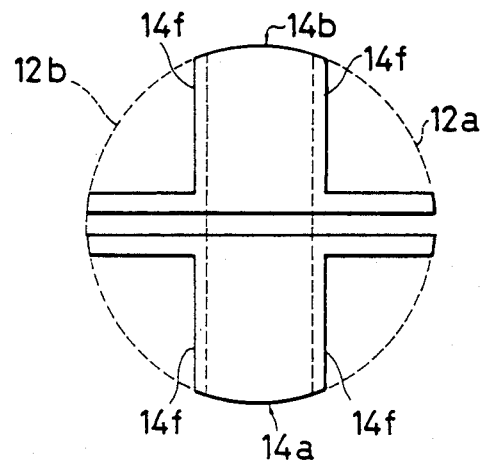

4,975,585

1

RADIATION DOSE MONITOR

BACKGROUND OF THE INVENTION

The present invention relates to a radiation dose monitor to measure distribution of radiation dosage.

FIG. 1 shows a conventional radiation dose monitor as disclosed in U.S. Pat. No. 3,808,441. In the ionization box housing (not shown), a power supply electrode 1 is provided to apply an electric field to the ions produced by radiation, a first pair of semi-circular collector electrodes 3 are separated by a band-shaped gap 3a and positioned above the power supply electrode 1 across a first ionization chamber 2, and a second pair of semi-circular collector electrodes 5 are separated by a band-shaped gap 5a and are arranged below the power supply electrode 1 across a second ionization chamber 4. The direction in which the second collector electrode 5 is divided at 5a is perpendicular to the direction in which the first collector electrode 3 is divided at 3a.

In the radiation dose monitor of the above construction, the gas in the first ionization chamber 2 and second ionization chamber 4 is ionized by a radiation beam passing vertically with respect to the power supply electrode 1. When a high positive DC voltage is applied to the power supply electrode 1, negative ions in the first and second ionization chambers 2 and 4 move to the electrode 1. At the same time, positive ions in the first ionization chamber 2 move to the first collector electrodes 3, while positive ions in the second ionization chamber 4 move to the second collector electrodes 5. Thus, ion currents flow. These ion currents are then transferred from the first collector electrode 3 and second collector electrode 5 to a measurement circuit, not shown, where the radiation dose can thus be measured from the values of the currents flowing through the collector electrodes 3 and 5, respectively. More specifically, the first and second collector electrodes 3 and 5 measure the radiation dose distribution of the radiation in first and second directions perpendicular to each other.

FIG. 2 shows another example of a conventional radiation monitor which can measure both the radiation dose distribution and total radiation dose, and it has a total radiation measurement power supply electrode 7 arranged below the second collector electrode 5 across a third ionization chamber 6. A total radiation collector electrode 9 of non-divided construction is arranged below the total radiation power supply electrode 7 across a fourth ionization chamber 8.

When a high positive DC voltage is applied to the total radiation power supply electrode 7 as well as to the power supply electrode 1, positive ions in the fourth ionization chamber 8 move to the total radiation collector electrode 9, and the resulting ion current is transferred from the electrode 9 to a measurement circuit, not shown. The radiation dose distribution is then found from the values of the ion currents flowing to the first collector electrodes 3 and the second collector electrodes 5, while the total radiation can be found from the value of the ion current flowing to the total radiation collector electrode 9.

Conventional radiation dose monitors of the construction described above require, in the first example, first and second ionization chambers 2 and 4, and in the second example, first, second, third and fourth ionization chambers 2, 4, 6 and 8, with the result that the whole device takes up a great deal of space.

SUMMARY OF THE INVENTION

An object of the present invention is to provide a radiation dose monitor that can be made compact by reducing the number of ionization chambers.

Another object of the invention is to provide a more reliable radiation monitor where the ion current flowing to the collector electrodes can be increased.

In a radiation dose monitor according to this invention, a power supply electrode is disposed on one side of an ionization chamber containing a gas which is ionized by a radiation beam, and a first pair of coplanar collector electrodes are disposed on the other side of the ionization chamber, being separated from each other by a first band-shaped gap. A second pair of coplanar collector electrodes are disposed adjacent to the first pair of collector electrodes, and separated from each other by a second band-shaped gap which extends in a direction at an angle with respect to the first band-shaped gap. The second pair of coplanar collector electrodes receive an ionization current from the ionization chamber and through the first band-shaped gap.

BRIEF DESCRIPTION OF THE DRAWINGS

FIG. 3 is a schematic diagram showing an embodiment of a radiation dose monitor according to the invention;

FIG. 3A is a vertical sectional view of the embodiment of FIG. 3;

FIG. 3B is a schematic plan view showing the disposition of the collector electrodes in the embodiment of FIG. 3;

FIG. 4 is a schematic diagram showing another embodiment of a radiation dose monitor according to the invention;

FIG. 5 is a schematic diagram showing another embodiment of a radiation dose monitor according to the invention;

FIG. 5A is a schematic plan view showing the disposition of the collector electrodes in the embodiment of FIG. 5.

DETAILED DESCRIPTION OF THE EMBODIMENTS

Figure 1:
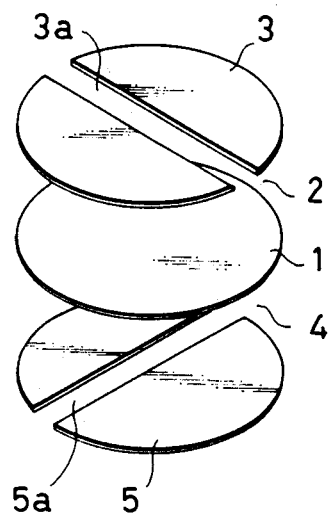
FIG. 1 is a schematic diagram showing an example of a prior-art radiation dose monitor.
Figure 2:
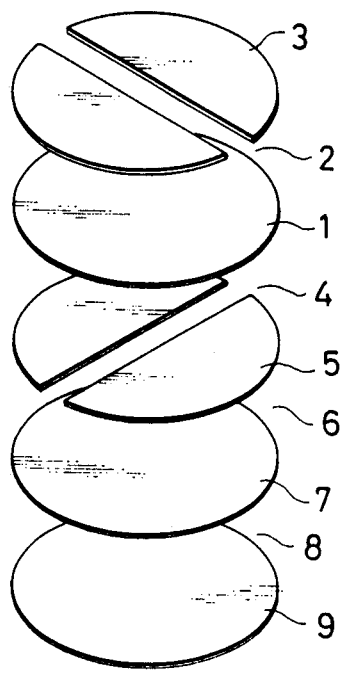
FIG. 2 is a schematic diagram showing another example of a prior-art radiation dose monitor.

An embodiment of the invention will now be described with reference to the drawings.

FIG. 3 shows an embodiment of the invention. As illustrated, a power supply electrode 10 is disposed on a first side (lower side as seen in the figure) of a distribution ionization chamber 11 containing a gas, typically air, which is ionized by a radiation beam. The power supply electrode 10 is connected to a power supply, not illustrated, which supplies a high DC (direct current) voltage.

A first pair of coplanar collector electrodes 12a and 12b are disposed on the other side (upper side as seen in the figure) of the ionization chamber 11 and are separated from each other by a band-shaped gap 12c. A second pair of coplanar collector electrodes 14a and 14b are disposed above the first pair of collector electrodes 12a and 12b being separated by an insulating spacer 21 of FIG. 3A, and are also separated from each other by a band-shaped gap 14c. The direction in which the band-shaped gap 14c extends is perpendicular to the direction in which the band-shaped gap 12c extends. The first and second pairs of collector electrodes 12a, 12b, 14a and 14b are connected through respective leads LD to a circuit MC for measuring the total ion currents and the distribution of the currents. An example of such a measuring circuit is shown and described in U.S. Pat. No. 3,808,441 issued Apr. 30, 1974 to Boux, which is hereby incorporated by reference.

As is best seen from FIG. 3B, the band-shaped gap 12c is wide enough so that parts 14d and 14e positioned directly over the gap 12c have surface areas comparable to the surface areas of the first pair of the collector electrodes 12a and 12b.

The power supply electrode 10, and the collector electrodes 12a, 12b, 14a and 14b are transparent to a radiation beam B, and are disposed substantially perpendicularly to the radiation of the beam B.

In operation, a high DC voltage, e.g., positive 300 V, is applied to the power supply electrode 10, while the collector electrodes 12a, 12b, 14a and 14b are held substantially at the ground potential. When a beam B of ionizing radiation propagates along the axis also indicated by B, the gas in the ionization chamber 11 is ionized, and because of the electric field across the power supply electrode 10 and the collector electrodes 12a, 12b, 14a and 14b, the ion current is collected by the first pair of collector electrodes 12a and 12b. The resultant currents through the collector electrodes and detected by the measuring circuit MC. The first pair of collector electrodes 12a and 12b, in combination with the measuring circuit MC, measures the distribution of the radiation in the direction perpendicular to the band-shaped gap 12c. Part of the ion current passes through the gap 12c to the second pair of collector electrodes 14a and 14b, which, in combination with the measuring circuit MC, measures the distribution of the radiation in the direction perpendicular to the band-shaped gap 14c.

In this way, distributions of the ion current in two directions perpendicular to each other can be measured.

FIG. 4 shows another embodiment of the invention. This embodiment differs from the embodiment of FIG. 3 in that a total radiation ionization chamber 15 is additionally provided below the power supply electrode 10, and a total radiation collector electrode 16 is provided below the power supply electrode 10 across the total radiation ionization chamber 15.

The distribution of the radiation is measured in the same way as in the embodiment of FIG. 3. In addition, ionization also takes place in the total radiation ionization chamber 15, and, because of the electric field across the power supply electrode 10 and the total radiation collector electrode 16, the ionization current due to ionization in the total radiation ionization chamber 15 flows through the total radiation collector electrode 16 and is detected by the measurement circuit MC. In this way, the total radiation is measured.

FIG. 5 shows yet another embodiment of the invention. This embodiment differs from the embodiment of FIG. 3 in that another distribution ionization chamber 17 is provided above the second pair of collector electrodes 14a and 14b, and another power supply electrode 18 is provided above the collector electrodes 14a and 14b across the ionization chamber 17. The power supply electrode 18 is connected to the same power supply to which the power supply electrode 10 is connected. In the embodiment of FIG. 5, the second pair of collector electrodes 14a and 14b are shown to have cut-away portions 14f which are positioned directly over the first pair of collector electrodes 12a and 12b so that the first pair of collector electrodes 12a and 12b are not covered by or overlapped by the second pair of collector electrodes 14a and 14b, as is best seen from FIG. 5A.

The ionization in the ionization chamber 11 and the resultant ionization current take place in the same way as in the embodiment of FIG. 3. In addition, a similar ionization takes place in the ionization chamber 17, and the ionization current, because of the electric field across the power supply electrode 18 and the collector electrodes 12a, 12b, 14a and 14b, flows through the collector electrodes 12a, 12b, 14a and 14b and is detected by the measurement circuit MC. This embodiment has an advantage that the ionization current flowing through the collector electrodes and hence detected by the measurement circuit can be substantially doubled.

In the embodiments described, the directions in which the band-shaped gaps 12c and 14c extend are perpendicular to each other, but they may be at an angle other than the right angles.

In the embodiments described, distribution is measured by collector electrodes provided in pairs, each pair consisting of two collector electrodes disposed on both sides of a band-shaped gap. But a group of three or more collector electrodes disposed on the same plane may be used, in place of the pair of the collector electrodes, to measure the distribution of the radiation in greater detail.

What is claimed is:

1. A radiation dose monitor comprising:
   an ionization chamber containing a gas which is ionized by a radiation beam;
   a power supply electrode to which a power supply voltage is applied and which is disposed on one side of said ionization chamber;
   a first group of coplanar collector electrodes, disposed on the other side of said ionization chamber from said power supply electrode and separated from each other by gaps; and
   a second group of coplanar collector electrodes adjacent to and overlying said first group of coplanar collector electrodes on the other side of said ionization chamber from said power supply electrode, and separated from said first group of coplanar collector electrodes by an insulating spacer to receive an ionization current which is generated in said ionization chamber and passes through said gaps;
   wherein the ionization current generated in said ionization chamber is collected at said first group of coplanar collector electrodes and also passes through said gaps and collected at said second group of coplanar collector electrodes;
   whereby distribution of the dose of the radiation beam within said ionization chamber is measured.

2. A radiation dose monitor according to claim 1, further comprising an additional ionization chamber and containing a gas which is ionized by a radiation beam and an additional power supply electrode disposed on one side of said additional ionization chamber;
   said second group of coplanar collector electrodes being disposed on the other side of said additional ionization chamber;
   said second group of coplanar collector electrodes having cut-away portions so that said first group of coplanar collector electrodes have parts not overlapped by said second group of coplanar collector electrodes;

said first group of coplanar collector electrodes receiving an ionization current which is generated in said additional ionization chamber and passes through said cut-away portions of said second group of collector electrodes;

wherein the ionization current generatedd in said additional ionization chamber is collected at said second group of coplanar collector electrodes and also passes through said cut-away portions of said second group of coplanar collector electrodes and collected at said first group of coplanar collector electrodes;

whereby distribution of the dose of the radiation beam within the ionization chambers is measured.

3. A radiation dose monitor comprising:

a first ionization chamber containing a gas which is ionized by a radiation beam;

a second ionization chamber containing a gas which is ionized by a radiation beam;

a first power supply electrode which is disposed on one side of said first ionization chamber and to which a power supply voltage is applied;

a second power supply electrode which is disposed on one side of said second ionization chamber and to which a power supply voltage is also applied;

a first group of coplanar collector electrodes disposed on the other side of said first ionization chamber and separated from each other;

a second group of coplanar collector electrodes disposed on the other side of said second ionization chamber and separated from each other;

said first group of coplanar collector electrodes and said second group of coplanar collector electrodes being adjacent to each other, disposed between said first and second power supply electrodes, and separated from each other by an insulating spacer;

wherein the ionization currents generated in said first and second ionization chambers are collected at said first and second coplanar collector electrodes.

4. A radiation dose monitor comprising:

an ionization chamber containing a gas which is ionized by a radiation beam;

a power supply electrode to which a power supply voltage is applied and which is disposed on one side of said ionization chamber;

a first pair of coplanar collector electrodes disposed on the other side of the ionization chamber from said power supply electrode and being separated from each other by a first band-shaped gap; and a second pair of coplanar collector electrodes disposed on said other side of the ionization chamber from said power supply electrode adjacent to and overlying said first pair of coplanar collector electrodes, and separated from each other by a second band-shaped gap, the direction in which said second band-shaped gap extends being at an angle with respect to the direction in which said first band-shaped gap extends;

said second pair of coplanar collector electrodes being provided to receive an ionization current which is generated in said ionization chamber and passes through said first band-shaped gap.

5. A radiation dose monitor according to claim 4, wherein the directions in which said first and second band-shaped gaps extend are perpendicular to each other.

6. A radiation dose monitor according to claim 4, wherein the width of said first band-shaped gap is large enough that the ionization current which passes through said first band-shaped gap and is received at said second pair of coplanar collector electrodes is comparable to the ionization current received by said first pair of coplanar collector electrodes.

7. A radiation dose monitor according to claim 4, further comprising means for sensing the ionization current received by said first and second pair of coplanar collector electrodes.

* * * * *